United States Patent

[11] 3,620,792

| [72] | Inventor | Erivan Hagopian |
| | | Lexington, Mass. |
| [21] | Appl. No. | 810,811 |
| [22] | Filed | Mar. 26, 1969 |
| [45] | Patented | Nov. 16, 1971 |
| [73] | Assignee | Cabot Corporation |
| | | Boston, Mass. |

[54] PROCESS FOR TREATING CARBON BLACK
10 Claims, No Drawings

| [52] | U.S. Cl. | 106/307 |
| [51] | Int. Cl. | C09c 1/44 |
| [50] | Field of Search | 106/307 |

[56] References Cited
UNITED STATES PATENTS

| 3,226,244 | 12/1965 | Jordan et al. | 106/307 |
| 3,247,003 | 4/1966 | Pollock | 106/307 |
| 3,279,935 | 10/1966 | Daniell et al. | 106/307 |
| 3,398,009 | 8/1968 | Deery | 106/307 |
| 3,436,240 | 4/1969 | Rogers, Jr. et al. | 106/307 |

FOREIGN PATENTS

| 895,990 | 5/1962 | Great Britain | 106/307 |

*Primary Examiner*—Tobias E. Levow
*Assistant Examiner*—H. M. S. Sneed
*Attorneys*—Kenneth W. Brown, Arthur S. Collins, Barry R. Blaker and Lawrence A. Chaletsky

ABSTRACT: This disclosure relates to the use of an oxide of nitrogen in combination with ozone as an additive in an aftertreatment process for preparing modified carbon blacks and to the novel carbon black products produced thereby.

PROCESS FOR TREATING CARBON BLACK

This invention relates to a process for the aftertreatment of carbon blacks to modify the surface characteristics thereof and to the new and improved modified carbon black products produced by the process. More particularly, this invention relates to a novel and highly efficient process for aftertreating carbon blacks whereby the surface properties of the carbon blacks are modified which entails treating the carbon blacks with an additive combination comprising ozone and an oxide of nitrogen. Furthermore, this invention relates to the new and improved carbon black products prepared by the novel process of the present invention.

Normally, the use of carbon black as an ingredient in black printing ink formulations is not only quite suitable but also very desirable. The black printing ink formulations usually comprise carbon black dispersed in a liquid medium consisting of toners, oil, varnishes or water and other compounds. Unfortunately, however, the preparation of a carbon black pigment suitable for use in the formulation of black ink systems, such as lithographic ink systems, has been a continuous problem in the carbon black industry. There are inherent in this problem two outstanding complicating factors, namely, the specialized properties required of the carbon black pigment and the physical state in which the pigment is supplied to manufacturers of black printing ink formulations.

Generally, the most desirable and efficient carbon blacks suitable for use in formulating black printing ink systems are carbon blacks characterized by having the properties of long flow, high jetness or masstone, and high tinctorial power. Moreover, since the shear forces most frequently utilized in dispersing carbon black pigments into the proper vehicle in the formulation of printing ink systems are relatively mild, ease of dispersion of the carbon black pigments in the appropriate vehicles is also a factor to be considered among the basic requisites of a suitable carbon black pigment. It is for this reason of achieving an efficient and thorough dispersion of the carbon black pigments in printing ink formulations that the manufacturers of printing ink systems require that the carbon black pigments be supplied in as fluffy a form as practicable. For a period of many years, carbon blacks prepared by the channel black process were used almost exclusively as pigments in the formulation of black printing inks. The channel blacks are well suited for use as the carbon black pigments in printing inks inasmuch as, in the fluffy form, the channel blocks are readily dispersible and inherently possess the property of low particle diameter resulting in excellent tinctorial power and the property of high volatile content which contributes to excellent long flow characteristics. However, in view of its greater efficiency and economy, the furnace black process for preparing carbon blacks has to a large extent replaced the channel black process, and, accordingly, the printing ink industry now uses in many instances furnace blacks as substitutes or channel blacks. Indeed, it is presently estimated that at least about 60 percent of all news inks and heatset inks contain furnace blacks as pigments and in these applications furnace black pigments have proved to be entirely satisfactory as replacements for the more costly carbon black pigments prepared by the channel process.

It is well known, however, that carbon blacks, and especially furnace blacks, vary greatly in regard to their particular characteristics and, accordingly, it has been recognized that the use of furnace blacks as pigments in offset or lithographic ink formulations is not particularly beneficial or satisfactory. The offset of lithographic printing inks suitable for commercial applications must possess maximum tinting strength and covering power. Therefore, high loadings of carbon black pigment in the offset or lithographic inks are normally utilized with amounts up to 20 to 25 percent by weight of carbon black commonly employed. The flow characteristics of the carbon black pigments, at these high levels of concentration, are of extreme importance, and, although many treatments for improving flow characteristics of furnace blacks are known, the manipulative steps involved therein generally affect the dispersibility properties of the carbon black pigment in an adverse manner.

Additionally, the properties required of a carbon black pigment suitable for use in the preparation of printing ink systems include high jetness and viscosity stability of the resultant ink formulations. The properties of the carbon black pigments which are responsible for these characteristics and reflect the coloring efficiency of carbon black pigments are Nigrometer scale, particle size, volatile content, the physical nature of the surface of the carbon black particles and the chemical nature of the volatile matter on the surface of the carbon black particles.

Aftertreatment processes for preparing carbon black products having modified surfaces and altered fundamental properties are well known in the art. For example, it is well known that the properties of carbon blacks, whether prepared by the channel black process or by the furnace black process, are enhanced, particularly for use in the preparation of printing inks, by an oxidation process which involves treating the carbon black at elevated temperatures with an oxygen-containing material, such as air or oxygen, so as to oxidize the surface of the carbon black particle. Various other methods of the preparation of carbon black pigments aftertreated by an oxidation technique have been proposed in the prior art. Such methods include contacting the carbon black with an aqueous solution of an oxidizing agent such as a mineral acid, a peroxide and the like, and treating the carbon black with a gaseous material such as air, ozone and steam. These methods are, however, subject to several undesirable features, among which are poor yields and the formation of lumps and aggregates of carbon black.

Accordingly, it is a primary object of this invention to provide a novel and improved process for the aftertreatment of carbon blacks in which the attendant disadvantages of the prior art are eliminated.

A more specific object of this invention is to provide a process for aftertreating carbon blacks which will produce carbon blacks having excellent flow properties and tinting strength, and a high degree of dispersibility.

A further object of this invention is to provide an improved process for preparing a carbon black which can be used in high concentrations in printing ink formulations.

A still further object of this invention is to provide a carbon black product which is especially suitable for use as pigment in ink formulations and which offers superior properties for ink formulations.

Another object of this invention is to provide a process for aftertreating carbon blacks which is quick and effective but yet sufficiently inexpensive to allow its use on a commercial scale.

Other and different objects, advantages and features of the present invention will become apparent to those skilled in the art upon consideration of the following detailed description and claims.

In accordance with this invention, it has been found that the above and still further objects are achieved by the utilization of a novel aftertreatment process which entails contacting a carbon black with a gaseous mixture comprising ozone in synergistic combination with an oxide of nitrogen.

The method of this invention can be conveniently carried out by contacting in vapor phase a carbon black with a gaseous mixture comprising ozone and an oxide of nitrogen to produce thereby a superior carbon black product not heretofore obtained in any other known manner. More particularly, a carbon black is contacted with the gaseous mixture of ozone and oxide of nitrogen by, for example, passing the gaseous mixture over the carbon black being treated therewith so as to produce a carbon black product capable of contributing superb properties to ink formulations such as lithographic inks and the like. After the treatment, excess amounts of the gaseous treating agent are removed from the resultant carbon black product by conventional techniques and the resultant modified carbon black product is collected. The treatment step is carried out at a temperature ranging from about 20° C. to about 300° C. A preferred temperature range varies from about 100° C. to about 225° C. Additionally, the length of time of the treatment is not critical and may be varied.

Generally speaking, the amount of gaseous mixture comprising ozone and an oxide of nitrogen utilized as the treating agent will be an amount sufficient to effectively and synergistically modify the properties of the resultant carbon black products per se so as to impart excellent properties to ink formulations containing the resultant treated carbon black products. In particular, in the practice of the present process, a carbon black is contacted with an amount of from about 1 to about 50 percent by weight of the carbon black of a gaseous mixture of ozone and an oxide of nitrogen. In a preferred embodiment of the present invention, a carbon black is contacted with an amount of from about 6 to about 20 percent by weight of the carbon black of a gaseous mixture of ozone and an oxide of nitrogen. An especially preferred embodiment involves contacting a carbon black with an amount of from about 9 to about 18 percent by weight of the carbon black of a gaseous mixture of ozone and an oxide of nitrogen. The gaseous mixture employed herein as the treating agent in the preparation of the carbon blacks having excellent properties functions in a synergistic manner inasmuch as the gaseous combination of the two components is more effective than a comparable amount of either ingredient taken separately. The gaseous mixture comprises amounts of ozone to oxide of nitrogen which may vary in the range of from about a 1:1.0 to 1:2.5 molar ratio, with a preferred range being from about a 1:1 to 1:2 molar ratio.

The carbon blacks which can be used in the process of this invention are the furnace blacks, channel blacks and thermal blacks. However, while carbon blacks generally are operable in the process of the invention, the present process is particularly suitable for furnace blacks such as semireinforcing furnace blacks (SAF), high abrasion furnace blacks (HAF), intermediate super abrasion furnace blacks (ISAF), fast extruding furnace blacks (FEF), and fine furnace blacks (FF).

Representative of the oxides of nitrogen which may be employed herein are nitric oxide, nitrogen dioxide, nitrogen tetroxide, nitrogen pentoxide and the like. The ozone used in the process of this invention may be obtained from any convenient source such as ozone generated by means of a commercial ozone generator.

The invention will be more readily understood by reference to the following examples which describe the advantageous and unexpected results achieved by the use of the aftertreated carbon black products of the present invention in the preparation of ink formulations containing the same. There are, of course, many other forms of this invention which will become obvious to one skilled in the art, once the invention has been fully disclosed, and it will accordingly be recognized that these examples are given for the purpose of illustration only and are not to be construed as limiting the scope of this invention in any way.

The following testing procedures are used in evaluating the physical properties and efficiency of the aftertreated carbon black products of the present invention as additives in printing ink formulations.

Nigrometer scale of a carbon black—This is a measure of the masstone or the intensity of jetness or blackness of the carbon black in a varnish paste and is closely related to the particle size of the carbon black.

In general, the lower the particle size of a carbon black, the lower its scale and the more intense is the blackness thereof. According to the recognized industry standards, "high color blacks" are those having a scale below 70, while the scales of "medium color blacks" vary from about 70 to 78 and "regular color blacks" have scales from about 80 to 90. In determining the color intensity of the carbon blacks employed hereinbelow, an ink formulation is prepared by dispersing on a three roll mill a mixture of 25 percent by weight of the carbon black to be tested and 75 percent by weight of a standard litho vehicle, which in this instance is a linseed oil based vehicle known to the Graphic Arts industry by the trade designation "Litho Varnish No. 1," and subjecting the mixture to four passes through the three roll mill. A sample of the resultant ink formulation is then placed on a microscopic glass slide and a relative measurement of the diffuse reflectance from the carbon black-varnish dispersion is obtained using the "Cabot Nigrometer," an instrument produced by Cabot Corporation, of Boston, Massachusetts.

Flow—Visual inspection of the carbon black-containing ink formulations is employed herein. The desirability of a carbon black in an ink formulation is demonstrated by the flow characteristics of the ink formulation, the more suitable carbon blacks being characterized by longer flow ratings.

Color and tone—The color properties of the carbon black-containing ink formulations are obtained on a sample prepared by mixing together 25 percent by weight of the carbon black to be tested with 75 percent by weight of a standard litho vehicle, such as "Litho Varnish No. 1," and subjecting the resultant mixture to four passes through a three roll mill. There are added to a 5 gram sample of the ink formulation prepared in the above manner 3 drops of cobalt. The color properties of the ink formulations are determined using a tristimulus colorimeter known as the "Coloreye" produced by Instrument Development Laboratories, Inc., of Attleboro, Massachusetts, and described in detail in their "Instruction Manual No. 1,000 G for Model D Coloreye." More particularly, the "Coloreye" measures light reflectance of a sample compared to a standard at three wavelengths in the visible light spectrum. The three wavelengths are designated as X,Y and Z and are substantially amber, green and blue wavelengths respectively. In the present instance, the sample employed as standard is an ink formulation containing Regal 660 as the ink pigment. Regal 660 is a low structure, intermediate super abrasion oil furnace black produced by Cabot Corporation having a Nigrometer scale of about 83, a pH value of about 7.9 and a nitrogen surface area of about 95 square meters per gram. In determining the color property of an ink formulation, the blueness contributed by a pigment is measured in terms of "Yellowness Factor" which is mathematically described as $$\left(\frac{X \text{ value} - Z \text{ value}}{Y \text{ value}}\right) \times 100$$

A lower value for the Yellowness Factors is indicative of a desirably bluer tone imparted to an ink formulation by pigment.

In the following examples there is described the preparation of the carbon black pigments which are hereinafter subjected to testing procedures in an ink formulation.

EXAMPLE 1

This example is given for the purpose of describing the carbon black ink pigment used herein as a control sample, namely, Regal 660. Regal 660 has been defined earlier as a low structure, intermediate super abrasion oil furnace black produced by Cabot Corporation and further characterized in having a Nigrometer scale of about 83, pH value of about 7.9 and a nitrogen surface area of about 95 square meters per gram.

EXAMPLE 2

To a suitable reaction vessel, equipped with means for addition and removal of heat, means for agitation, temperature recording means, means for addition of reactants including means for metering the amount of gaseous treating agent to be employed, means for introducing an inert carrier stream such as air, means for removing excess treating agent from the treating zone, and means for removal of aftertreated carbon black product, there is charged 100 parts by weight of Following the procedure of example 2, and substituting for the ozone employed therein a gaseous mixture comprising ozone and nitrogen dioxide in a 1:1 molar ratio, there is produced a modified carbon black containing 11.75 percent by weight of the carbon black of the gaseous mixture.

EXAMPLE 4

The carbon black pigment of this example is Regal 660, as described in example 1, which has been heated to a temperature of from about 150° C. to about 160° C. by means of a superheated stream of air. The resultant carbon black product is employed herein as an additional control sample.

EXAMPLE 5

One hundred parts by weight of Regal 660 carbon black is charged to a suitable reaction vessel equipped with means for addition and removal of heat, means for agitation, temperature recording means, means for addition of reactants including means for metering the amount of gaseous treating agent to be employed, means for introducing an inert carrier stream such as air, means for removing excess treating agent from the treating zone, and means for removal of aftertreated carbon black product. The temperature of the reactor charge is adjusted to about 150° C. to about 160° C. by means of a stream of superheated air and addition of ozone to the reactor is begun. The Regal 660 carbon black is contacted with the ozone for a period of about one second whereby a modified carbon black containing 6 percent by weight of the carbon black of ozone is produced. Removal of excess ozone from the treating zone is accomplished in any well-known manner and the resultant aftertreated carbon black is recovered.

EXAMPLE 6

Following the procedure of example 5 and replacing the ozone with nitrogen dioxide, there is obtained a modified carbon black containing 5.75 percent by weight of the carbon black of nitrogen dioxide.

EXAMPLE 7

In accordance with the procedure of example 5 and using in lieu of the ozone employed therein a gaseous mixture comprising ozone and nitrogen dioxide in a 1:1 molar ratio, there is prepared a modified carbon black containing 11.75 percent by weight of the carbon black of the gaseous mixture.

EXAMPLE 8

The procedure of example 5 is repeated with the exception that nitrogen dioxide is substituted for the ozone whereby there is obtained a modified carbon black containing 11.5 percent by weight of the carbon black of nitrogen dioxide.

EXAMPLE 9

Following the procedure of example 5 and substituting for the ozone utilized therein a gaseous mixture comprising ozone and nitrogen dioxide in a 1:2 molar ratio, there is produced a modified carbon black containing 17.5 percent by weight of the carbon black of the gaseous mixture.

EXAMPLE 10

A reaction vessel as described in example 2 is charged with 100 parts by weight of Regal 660 carbon black. Addition of ozone to the reaction vessel containing the carbon black is then commenced and the temperature of the reactor charge is adjusted to from about 150° C. to about 160° C. by means of a stream of superheated air. The Regal 660 carbon black is contacted with the ozone for a sufficient period of time, i.e., about 1 second, to produce a modified carbon black containing 6 percent by weight of the carbon black of ozone. Excess ozone is removed from the treating zone and the resultant aftertreated carbon black product is collected by any conventional technique.

EXAMPLE 11

In accordance with the procedure of example 10 and employing nitric oxide in lieu of the ozone utilized therein, modified carbon black containing 3.75 percent by weight of the carbon black of nitrous oxide is obtained.

EXAMPLE 12

The procedure of example 10 is repeated with the exception that the ozone is replaced by gaseous mixture comprising ozone and nitric oxide in a 1:1 molar ratio, whereby there is prepared a modified carbon black containing 9.75 percent by weight of the carbon black of the gaseous mixture.

The following examples are given for the purpose of evaluating the physical properties and efficiency of the carbon black products described in examples 1 through 12 as pigments in ink formulations. The ink formulations utilized in the testing procedures are prepared by admixing a 25 gram sample of each of the carbon blacks of examples 1 through 12 with a 75 gram sample of "Litho Varnish No. 1," which is a standard litho vehicle. Each mixture of carbon black and litho vehicle is then subjected to four passes through a three roll mill. The resultant ink formulations are tested for Nigrometer scale, flow, and color properties utilizing the procedures described hereinabove.

EXAMPLE 13

An ink formulation is prepared by admixing a 25 gram sample of a carbon black as described in example 1 and a 75 gram sample of a linseed oil based vehicle known to the Graphic Arts industry by the trade designation, "Litho Varnish No. 1," which is a standard litho vehicle. The resulting mixture is dispersed on a three roll mill and is subjected to four passes through the three roll mill. A sample of the resultant ink formulation is then removed. In accordance with the testing procedures defined herein for measuring such properties, the properties of Nigrometer scale, flow and color of ink formulation are determined. The results observed are given in table I

EXAMPLES 14–24

Following the procedure of example 13 and substituting each of the carbon black products as described in examples 2 through 12 for the carbon black product as described in example 1, additional ink formulations are prepared. The results of the determinations of the properties of Nigrometer scale, flow and color of the ink formulations obtained in these examples are summarized in table I.

TABLE I

| Example Number | Carbon black product utilized in ink formulation | Nigrometer scale | Flow | "Coloreye" reading X | Y | Z | Yellowness factor |
|---|---|---|---|---|---|---|---|
| 13 | Example No. 1 | 83.0 | No flow | | | | |
| 14 | Example No. 2 | 76.5 | Flow | 73.9 | 77.2 | 90.2 | −21.1 |
| 15 | Example No. 3 | 67.0 | Flow | 50.0 | 53.6 | 70.2 | −37.7 |
| 16 | Example No. 4 | 77.5 | No flow | 83.9 | 87.1 | 99.3 | −17.7 |
| 17 | Example No. 5 | 78.0 | Flow | 82.2 | 85.0 | 96.1 | −16.4 |
| 18 | Example No. 6 | 80.5 | No flow | 89.4 | 91.7 | 101.2 | −12.9 |
| 19 | Example No. 7 | 67.5 | Flow | 53.2 | 57.1 | 74.0 | −36.4 |
| 20 | Example No. 8 | 74.0 | No flow | 73.4 | 77.2 | 92.0 | −24.1 |
| 21 | Example No. 9 | 70.5 | Flow | 59.4 | 63.6 | 81.0 | −34.0 |
| 22 | Example No. 10 | 79.0 | | | | | |
| 23 | Example No. 11 | 82.0 | | | | | |
| 24 | Example No. 12 | 69.5 | | | | | |

From the foregoing results it is evident that the modified carbon blacks prepared in accordance with the practice of this invention are notably superior in performance as ink pigments to the carbon blacks not similarly treated and employed herein as control samples for comparative purposes. The results in the above table I demonstrate that the Nigrometer scale, flow characteristics, and/or other color properties of a carbon black contacted with a gaseous mixture comprising ozone and an oxide of nitrogen are clearly superior to those of the untreated carbon black or the carbon black contacted with either of the components of the gaseous mixture. A study of the data contained in the above table I reveals that the color properties of the carbon black pigments prepared by the present process are advantageously improved. This superior blue tone is shown by review of the Yellowness Factor values which are much lower for each carbon black pigment prepared according to this invention than the values obtained for the carbon black pigments employed herein as control samples. Furthermore, the results achieved pursuant to the present invention are truly remarkable and surprising since it is shown by the above data that the untreated carbon blacks and the carbon blacks treated with an oxide of nitrogen only, if used as ink pigments, will result in the preparation of ink formulations having no flow. Accordingly, the beneficial results of this invention are to be attributed to the use of a gaseous mixture comprising ozone and an oxide of nitrogen, which composition is more effective than either of the components taken separately. In addition, it is to be understood that neither the type of carbon black to be contacted with the gaseous mixture of ozone and oxide of nitrogen nor the time of contacting the carbon black therewith is critical in the present process.

While this invention has been described with respect to certain embodiments, it is not so limited, and it should be understood that variations and modifications thereof may be made which are obvious to those skilled in the art without departing from the spirit or scope of the invention.

The embodiments of the invention in which an exclusive property or privilege is claimed are defined as follows:

1. A process for preparing a modified carbon black which comprises contacting a carbon black at a temperature of from about 20° C. to about 300° C. with an effective amount of a gaseous mixture comprising ozone and an oxide of nitrogen sufficient to prepare a modified carbon black containing from about 1 to about 50 percent by weight of the carbon black of said gaseous mixture, wherein the molar ratio of the ozone to the oxide of nitrogen in said gaseous mixture is from about 1:0.1 to about 1:2.5.

2. A process as defined in claim 1 wherein said carbon black is a furnace black.

3. A process as defined in claim 1 wherein said carbon black is contacted with an effective amount of said gaseous mixture sufficient to prepare a modified carbon black containing from about 6 to about 20 percent by weight of the carbon black of said gaseous mixture.

4. A process as defined in claim 1 wherein said carbon black is contacted with an effective amount of said gaseous mixture sufficient to prepare a modified carbon black containing from about 9 to about 18 percent by weight of the carbon black of said gaseous mixture.

5. A process as defined in claim 1 wherein the temperature range is from about 100° C. to about 225° C.

6. A process as defined in claim 1 wherein the molar ratio of the ozone to the oxide of nitrogen in said gaseous mixture is from about 1:1 to about 1:2.

7. A process as defined in claim 1 wherein said oxide of nitrogen is nitric oxide or nitrogen dioxide.

8. A modified carbon black especially suitable for use as an ink pigment containing from about 1 to about 50 percent by weight of the carbon black of a gaseous mixture comprising ozone and an oxide of nitrogen, wherein the molar ratio of the ozone to the oxide of nitrogen in said gaseous mixture is from about 1:0.1 to about 1:2.5.

9. A modified carbon black as defined in claim 8 wherein the molar ratio of the ozone to the oxide of nitrogen in said gaseous mixture is from about 1:1 to about 1:2.

10. A modified carbon black as defined in claim 9 wherein said carbon black contains from about 6 to about 20 percent by weight of the carbon black of said gaseous mixture.